US007778855B2

United States Patent
Holliday (10) Patent No.: US 7,778,855 B2
(45) Date of Patent: Aug. 17, 2010

(54) AUTOMATIC SELF-OPTIMIZING QUEUE MANAGEMENT SYSTEM

(75) Inventor: Stuart Holliday, Bugbrooke (GB)

(73) Assignee: Infrared Integrated Systems Limited (GB)

( * ) Notice: Subject to any disclaimer, the term of this patent is extended or adjusted under 35 U.S.C. 154(b) by 511 days.

(21) Appl. No.: 11/894,573

(22) Filed: Aug. 21, 2007

(65) Prior Publication Data

US 2008/0059274 A1  Mar. 6, 2008

(30) Foreign Application Priority Data

Aug. 22, 2006  (GB)  ................ 0616646

(51) Int. Cl.
*G07C 1/00* (2006.01)
*G06F 19/00* (2006.01)
(52) U.S. Cl. ............................. 705/7; 705/8
(58) Field of Classification Search ............ None
See application file for complete search history.

(56) References Cited

U.S. PATENT DOCUMENTS

| 3,808,410 | A | | 4/1974 | Schlesinger | 235/156 |
|---|---|---|---|---|---|
| 4,700,295 | A | * | 10/1987 | Katsof et al. | 705/10 |
| 5,581,625 | A | | 12/1996 | Connell | 382/1 |
| 5,953,055 | A | | 9/1999 | Huang et al. | 348/155 |
| 5,971,605 | A | | 10/1999 | Aoki et al. | 368/89 |
| 2003/0036936 | A1 | * | 2/2003 | Steichen et al. | 705/7 |
| 2005/0117778 | A1 | | 6/2005 | Crabtree | 382/103 |

FOREIGN PATENT DOCUMENTS

WO  WO 93/00641  1/1993
WO  WO 2006/135976 A1  12/2006

OTHER PUBLICATIONS

Larson, Richard C.; The Queue Inference Engine: Deducing Queue Statistics from Transactional Data; May 1990; Management Science, vol. 36, No. 5; p. 586-601.*

* cited by examiner

*Primary Examiner*—Susanna M Diaz
*Assistant Examiner*—Ashley Y Chou
(74) *Attorney, Agent, or Firm*—Renner Kenner Greive Bobak Taylor & Weber (57) ABSTRACT

A queue management system for e.g. supermarket checkouts uses counting devices located at checkouts and optimally entrances/exits in conjunction with P.O.S. information to produce a schedule of how many checkouts are needed to avoid queue length exceeding preset limits. The system includes a dynamic learning system which can optimise calculated schedules on the basis of historical data.

12 Claims, 6 Drawing Sheets

AUTOMATIC SELF-OPTIMIZING QUEUE MANAGEMENT SYSTEM

TECHNICAL FIELD

The present invention relates to a queuing system for users, e.g. people, queuing to use a facility. The invention has been devised for use in retail outlets (e.g. supermarkets), in order to provide a real-time, dynamic schedule that can be used to control the length of checkout queues, whilst helping to reduce inefficiency. The invention is equally applicable to other situations in which a plurality of facilities are available that can be rendered operative or inoperative according to need. Examples include ticket barriers and cashiers in banks. The invention is particularly suitable for situations in which a separate queue is formed for each facility but may be equally applicable to a 'single queue' arrangement.

BACKGROUND ART

It is known in retail outlets to vary the number of checkouts open according to the number of people queuing. This is normally achieved in two ways; the first is by long-term scheduling, typically done weeks in advance. This provides a fixed schedule for the retailer to work to. On the day, a manager may react to the queues that form, by taking staff from some other duties to open extra checkouts. However, this requires the manager to be able to react to the number of people queuing at any instant. It is desirable to provide a computer system which can predict the number of facilities (checkouts) needed ahead of time.

Some supermarkets guarantee maximum queue lengths and use this as a marketing tool. In these cases, there is a target queue length N. Therefore, if the total number queuing is Q, the number of checkouts required is Q/N. However, in order to have the required number of checkouts open in order to keep the queues shorter than the target length, the supermarket operator needs to be able to measure and react to the number of people queuing. Even where stores do not guarantee a maximum queue length, it should be noted that, in general, stores implicitly make a judgement about how long queues should be, and therefore a queue management system has general applicability.

It should also be noted that the number of people queuing may be considered and measured in shopping units, where a shopping unit is a number of people associated with one transaction, trolley or basket, and this is another factor to be considered when attempting to measure and control queues.

There have been some past efforts to provide a computer system for predicting the required number of facilities (e.g. checkouts) ahead of time.

U.S. Pat. No. 3,808,410 employs a system which translates door arrival information directly into a checkout requirement via a pre-determined lookup table.

U.S. Pat. No. 5,557,513 uses a predetermined statistical model of store transit time, combined with door arrival information, to predict checkout requirement.

DISCLOSURE OF INVENTION

The present invention provides a method of operating a queue management system as described in claim 1. Briefly stated, the invention takes into account a number of additional factors in determining the required number of facilities. Some of these additional factors are devised in novel ways and are described in the subsidiary claims. For maximum accuracy people should be counted in groups, where appropriate in a particular application (e.g. 'shopping units') rather than individuals.

The described method improves upon the known methods in key ways.

1) The system gathers information from queue monitors about real conditions in the store, as well as using live POS ('point of sale') information from the facilities (e.g. checkouts)
2) The system learns dynamically, so that it can make the optimal decision regarding how many facilities to render operative, given the information available to it,
3) The system is fault tolerant, as the learning mechanism allows for the system to recognize that particular sensor data is incorrect, and can be ignored
4) Once installed, the system requires no human intervention to generate forecast data, or to configure statistical models
5) The system preferably draws up a dynamically amended schedule for the rest of the current day, based on all of the information currently available The use of queue length monitors, combined with live POS information, in addition to information from sensors above doors, etc for the purpose of dynamic scheduling is novel. It allows the system to produce more accurate results than the prior art, and also enables the system to learn so that it can improve its accuracy.

The system learns by gathering data from door/checkout sensors and POS information, allowing it to know what the likely number of people is who will arrive at the checkouts, given the information available. The specific learning technique used by the system could be one of: neural networks, vector quantisation, linear models, non linear models, statistical models, support vector machines etc.

The prior art uses predetermined models, which are not adaptive to change, and which are difficult to configure (often sub-optimal guesses must be made for the parameters of such systems). Other more general staff scheduling methodologies base their estimates on sales forecasts, drawn up well in advance. This means that they cannot, for example, schedule staff correctly for a store which has only recently opened, or properly adapt to recent changes in a store's configuration or popularity. By using a learning system to learn the behaviour of a store in a dynamic way, it is possible to improve on the prior art, by being much more responsive to changes in a store, new stores, etc. The described system also improves on the prior art by optimising the result using real data gathered from checkout monitors about real conditions in the store 24/7, with no human intervention. In addition, because the system learns dynamically, and makes optimal use of the information available, the system can be fault tolerant, to faults in the sensors; for example if a door sensor ceases to function, the system can quickly learn that the data from that door sensor is no longer relevant to the results, and so adapts to correct itself. The prior art arrangements do not have this property, and will give incorrect results in the event of a failure, up until a human intervenes and corrects the fault. Furthermore, conventional fixed schedulers cannot address variations in demand caused by short term variances in the input conditions, such as bad weather or one-off local events, which may cause uncharacteristic variations in the required number of facilities, whereas a dynamic system can respond to such changes.

Since the system takes in information about the status of a store dynamically, and knows what is likely to happen, it is able to produce both short and long term staffing schedules to account for what is likely to happen during the rest of the day, and in future days. These schedules are constantly revised and updated with the latest possible information, in contrast to existing scheduling systems, which generally are run only from time to time (often as infrequently as once every two weeks or more).

BRIEF DESCRIPTION OF THE DRAWINGS

An embodiment of the invention will now be described by way of example only and with reference to the accompanying drawings in which.

BEST MODE FOR CARRYING OUT THE INVENTION

Operation of the System

Figure 1:
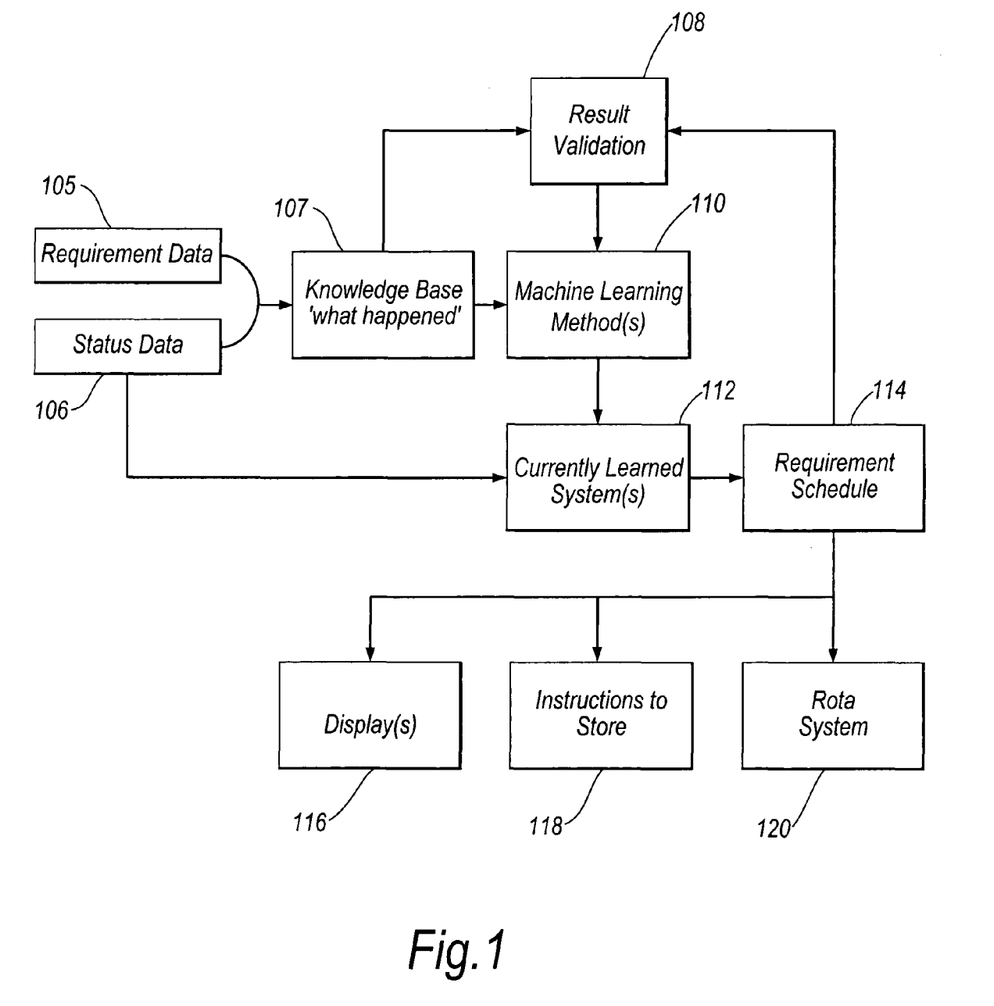
FIG. 1 is a block diagram illustrating schematically a learning scheduler system.

The operation of an embodiment of queue-management system is illustrated in FIG. 1.

1) Sensor data is collected (105) that is relevant to forecasting demand/requirement ahead of time. In particular, for shops, this may be data from door people counters, car park sensors, electronic point of sale data, etc.

2) Data (106) is also collected from queue monitors. This data informs the system of how many people are waiting, and provides ground truth information to the system, which can be used as the basis for learning without human intervention.

3) The data is combined in a 'Knowledge base' (107), which represents a history of what has happened. The specific implementation could vary considerably; for example a database could be used, or alternatively the knowledge could be encoded within the weights of an artificial neural network, an expert system, or other encoding.

4) Given the data from the queue monitors and the point of sale system, it is possible to automatically calculate exactly how many checkouts/facilities were required. Combined with the other sensor data in the knowledge base, this can be used as the training input for a machine learning system (110). This is updated as frequently as is desired, to produce a currently learned system (112).

The specific machine learning system used can vary; indeed, it may be beneficial to have a hybrid approach in which more than one method is used, and the best selected based upon how good the results of each method have been (which is known as the system self validates).

Possible methods to use for the machine learning system (110) include (but are not limited to) pattern recognition systems (neural networks, vector classifiers, radial basis function networks, Bayes classifiers, etc), function mapping systems (linear and non linear models, etc) statistical modelling systems (Markov models, generative topographic mapping, Bayesian networks, Gaussian mixture models, etc).

5) Live status information is fed into the currently learned system (112), which then produces a requirement schedule (114). This schedule gives a best estimate for the number of facilities/checkouts that will be required, both immediately, and going forward for the rest of the day, as well as for future days if required.

6) The requirement schedule's immediate information can be acted on to improve efficiency and reduce queues, by ensuring that the correct number of facilities are operative. This can be achieved by giving an instruction to the store automatically from the system (118), via a display (116), audio prompt, handheld instrument (e.g. a pager), or other means.

7) The requirement schedule for the rest of the day (or sections of it, i.e. the next hour) may also be displayed graphically, numerically, or via some other means, or selected points may be taken from it. This information is relevant, as it can be used as a 'pre-warning' of what is likely to happen in the near future, which can be used to improve efficiency, by allowing breaks to be scheduled in the near future, decision about whether it is worthwhile taking staff from other duties, etc.

8) The requirement schedule for future dates, (as well as the history of what the requirement turned out to be in past days) can be used as a very valuable input for 'fully featured' scheduling/rota systems (120), as it provides more accurate past data and estimates of future requirements than traditional methods.

9) The requirement schedule can be stored and later automatically matched up against the actual requirement, in order to validate the system (108). This allows the system to detect when its predicted checkout requirement schedule does not match up well with what is happening. The learning system can respond to this, by selecting a different method, relearning using only the latest data, or otherwise correcting the result.

The above-described system may be implemented in a computer system for operating the queue management system.

Figure 2:
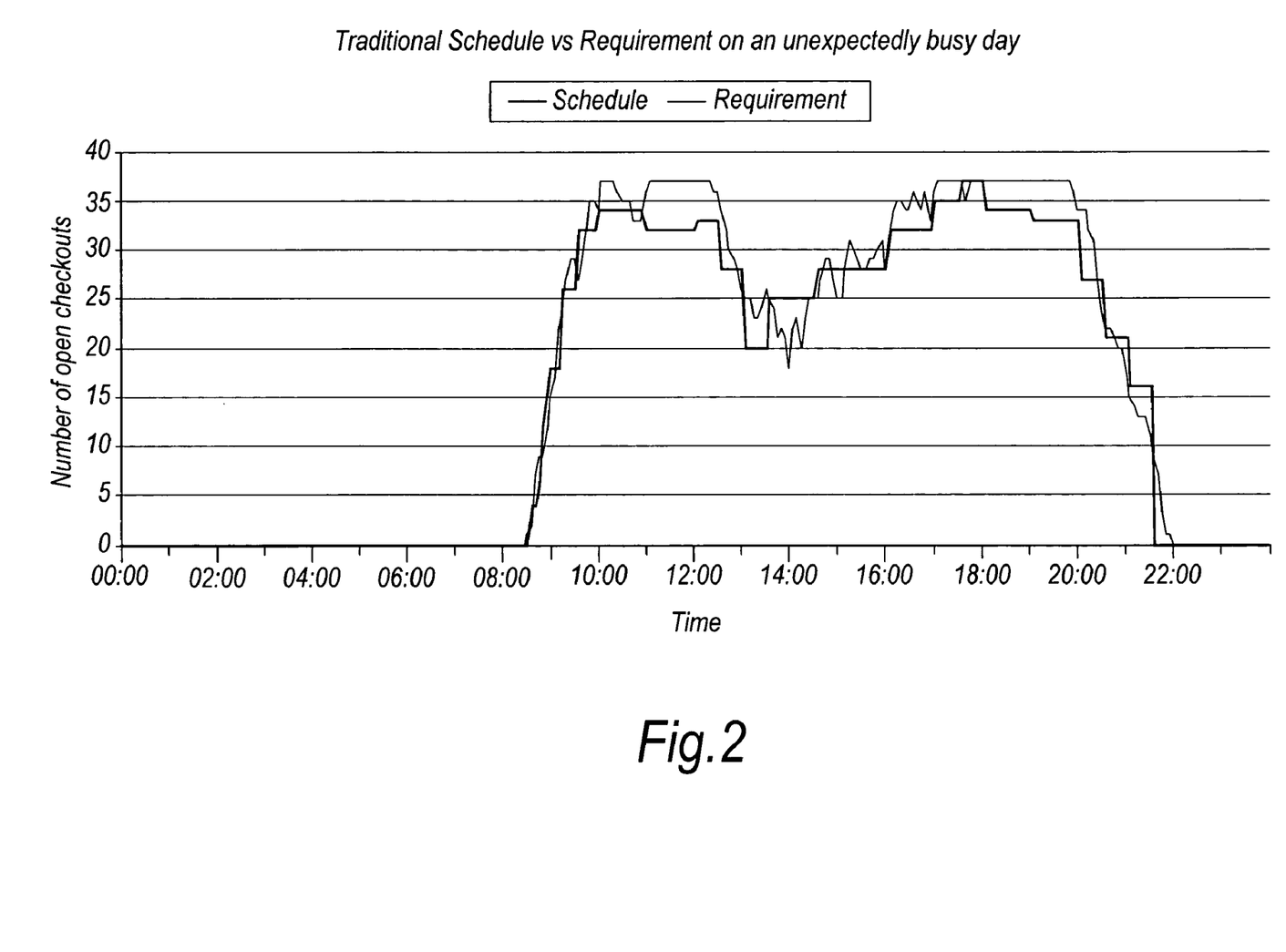
FIG. 2 is a graph of number of checkouts against time, illustrating measured data for scheduled and actual checkout requirements in a supermarket.

FIG. 2 is a graph of number of checkouts against time at a supermarket, and shows the measured differences between a traditional schedule and actual checkout requirements on an unexpectedly busy day. The discrepancies, where unexpected demand exceeds the pre-scheduled provision of checkouts can be clearly seen.

Figure 3:
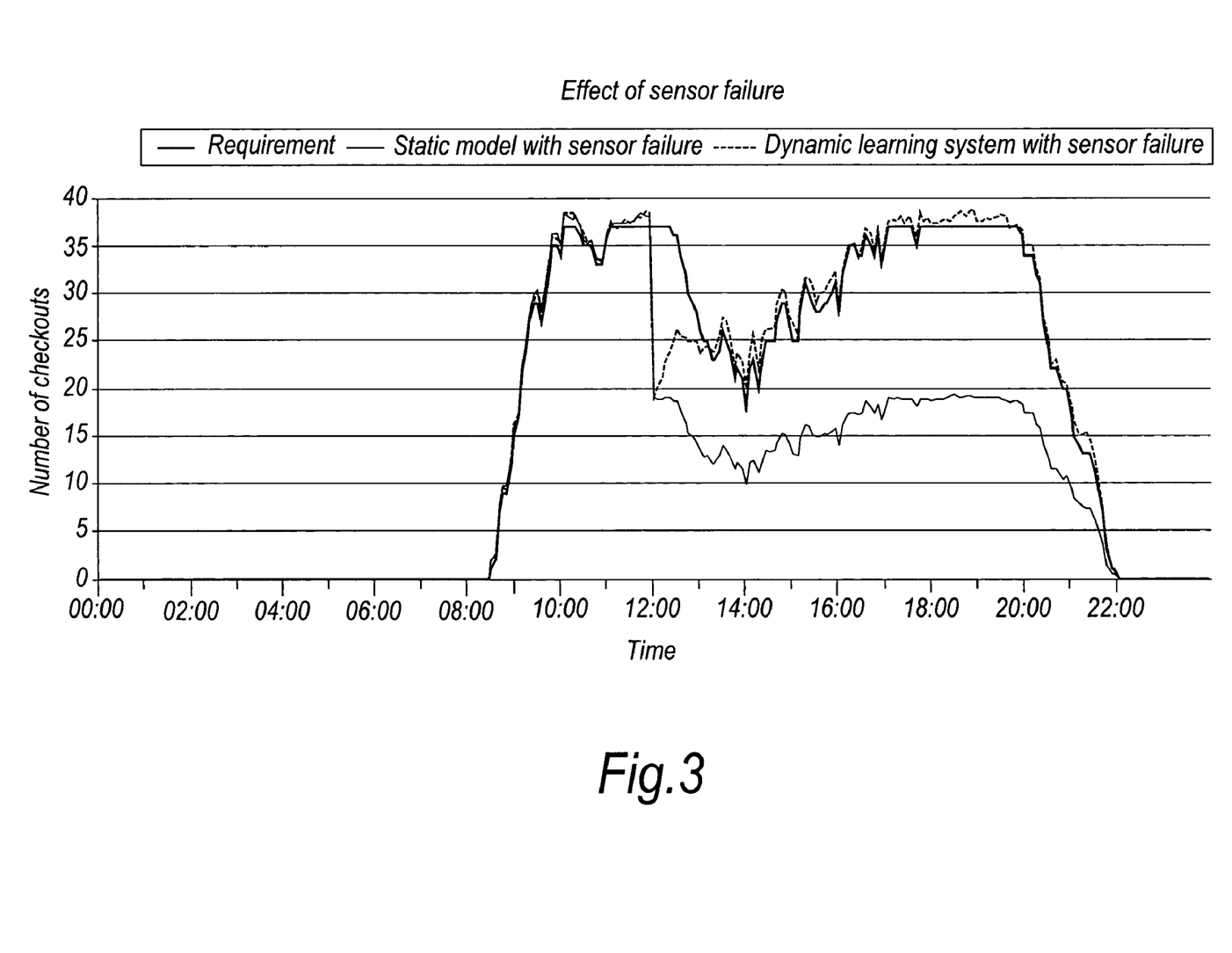
FIG. 3 is a graph of number of checkouts against time, illustrating the effect of a sensor failure on different scheduling systems.

FIG. 3 is a graph showing the requirement of checkouts throughout the day, and the provision of checkouts in accordance with a dynamic learning system, which can be seen to match the requirement more closely than in FIG. 2. However, the graph also shows the effect that a sensor failure at 12:00 has on both a static model and the dynamic learning system. A static model is defined as a system that uses fixed existing data (for example a look up table) or uses human intervention and cannot learn dynamically on its own. As described above, it can be seen that the dynamic learning system quickly adapts to the sensor failure, and continues to closely match the actual checkout requirement after a short time. By contrast, the static model continues to incorrectly model the demand, on the basis of the defective sensor data.

Figure 4:
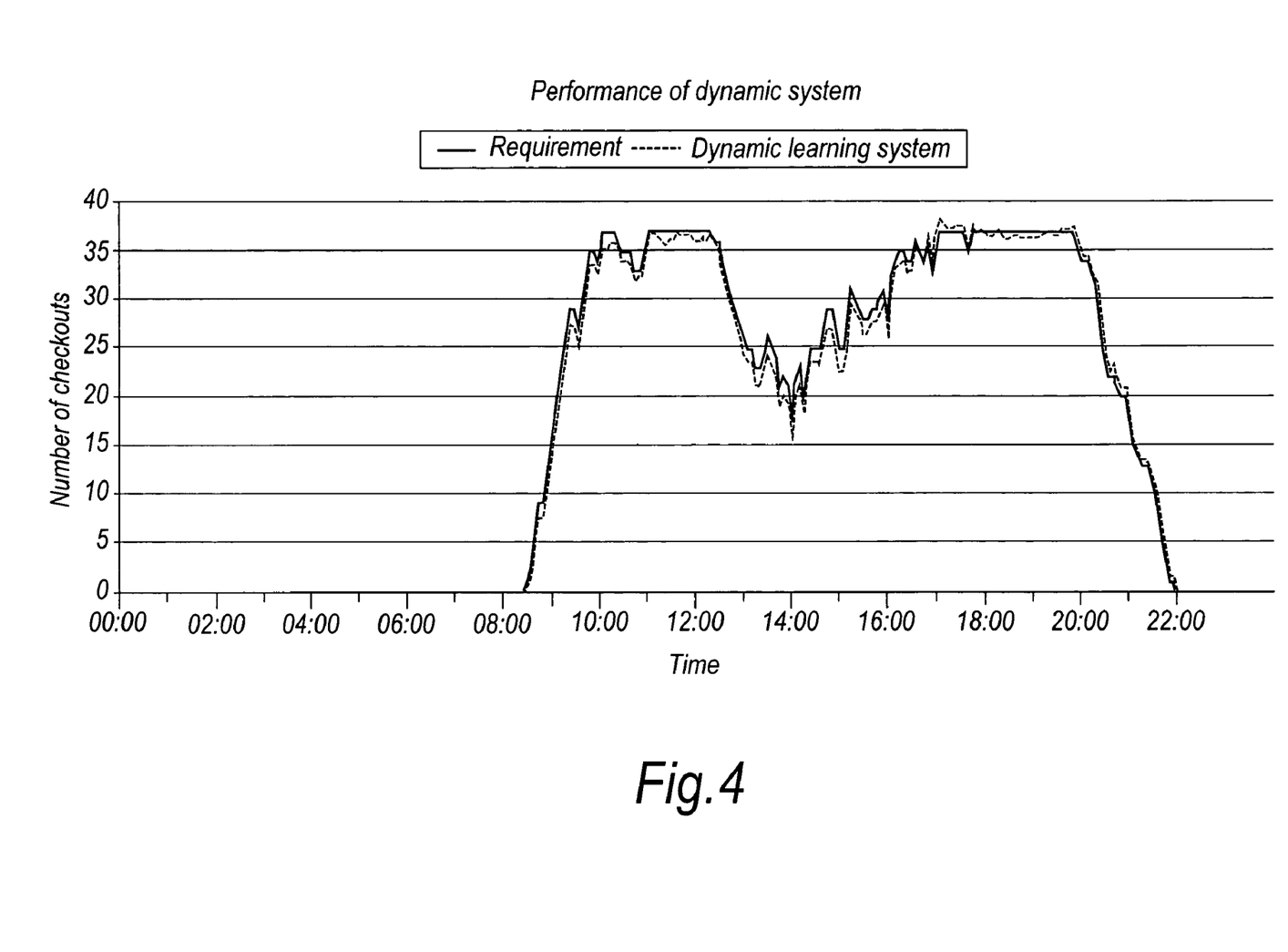
FIG. 4 is a graph showing the described learning system in operation.

FIG. 4 shows the described learning system in operation when no sensor failure occurs. This shows that the dynamic learning system follows the requirement closely across the entire working period.

Figure 5:
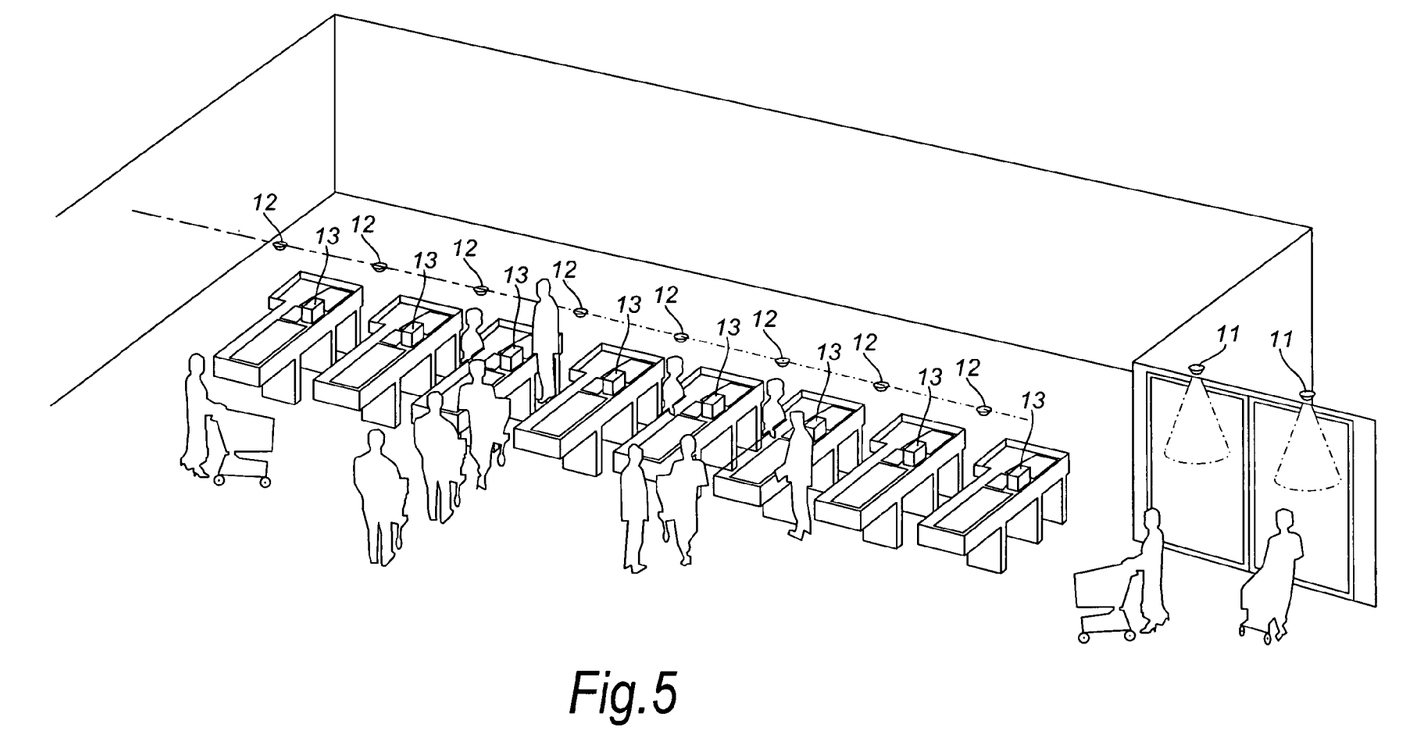
FIG. 5 is a schematic plan of a supermarket showing the location of apparatus used to implement the present invention.
Figure 6:
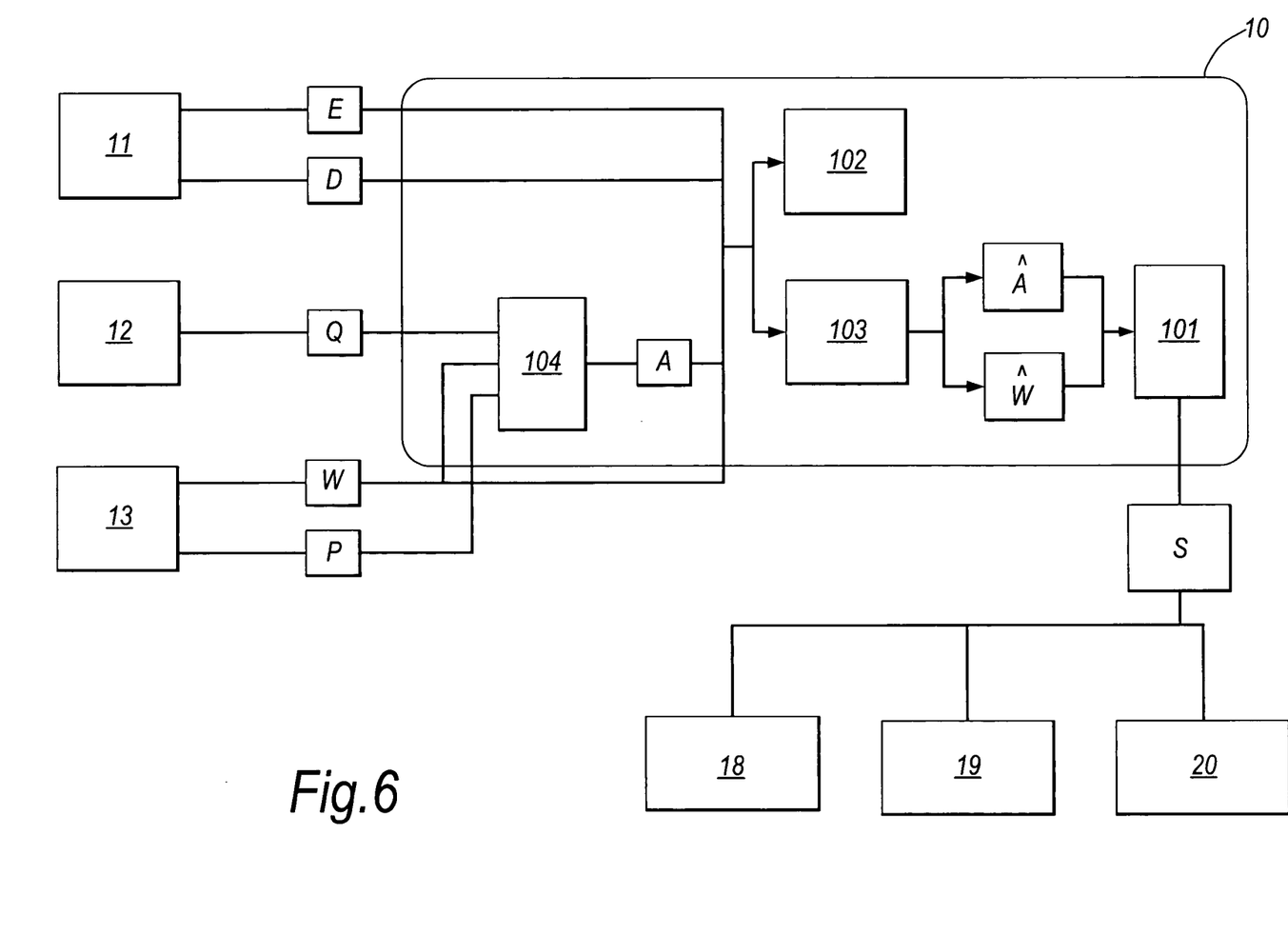
FIG. 6 is a block diagram illustrating how information from the apparatus is used.

The details of a predictive queue management system as used in a supermarket are illustrated in more detail in FIGS. 5 and 6.

A central processing system 10 receives inputs from
- one or more counting devices 11 each mounted near to an entrance door of the supermarket to count the number of people entering and leaving the supermarket
- a series of sensors 12, e.g. infrared cameras or other suitable devices positioned to enable a determination of the number of people arriving at the queues
- point of sale (POS) devices 13 positioned at checkouts for supplying data relating to the number of POS transactions made at each checkout and the time taken between transactions, the latter of which can be used to calculate the average time taken to clear a customer. POS information usually takes the form of electronic information from the checkout till system, however, data from barcode scanners, pressure sensors, or other sensors which can be used to detect when activity is occurring at the checkouts can be used.

Central processor 10 calculates the number of cashiers required according to a cashier requirement equation indicated at block 101. The derivation of the cashier requirement equation will now be explained.

Counting devices 11 are used to calculate the number of people E that have entered the supermarket in time step m and the number of people D that have left the supermarket in time step m. The conversion of people to shopping units can be made by comparison of people entering and leaving the supermarket with the number of transactions occurring in a time period.

Queue counting devices 12 supply the total number of people $Q_t$ across all checkout queues at time t.

POS devices 13 supply the average time W taken to clear one customer and the number P of the transactions that occur in a time step m.

The Checkout Requirement Equation $Q_t$=Total number queuing across all checkouts at time t A=Queue arrivals across all checkouts over a timestep of m seconds S=Checkouts open W=time taken to clear a shopping units (in seconds)

Now, queue at time (t+1)=queue at time (t)+arrivals−departures $$\Rightarrow Q_{t+1} = Q_t + A - \text{Departures} \qquad (1)$$

Departures is the number of shopping units that leave the queue (checkout)

$$\text{Departures} = \frac{m}{W} * S \qquad (2)$$

We want the queues at time (t+1) to be a particular length N $$\Rightarrow Q_{t+1} = N*S \qquad (3)$$

An equation for the number of checkouts required (S) can now be derived:

$$\Rightarrow N*S = Q_t + A - \frac{m}{W} * S \qquad (4)$$

$$\Rightarrow N*S + \frac{m}{W} * S = Q_t + A \qquad (5)$$

$$\Rightarrow \left(N + \frac{m}{W}\right) * S = Q_t + A \qquad (6)$$

$$\therefore S = \frac{Q_t + A}{N + \frac{m}{W}} \qquad (7)$$

Given the current total queue length, the number of arrivals at the checkouts, and time taken to checkout each customer, the number of 'open' checkouts required to reach a particular target queue level over a defined period of time can be derived. This equation can be used for determining the "open checkouts" requirement.

The Separate Elements of the Cashier Requirement Equation

For the checkout requirement equation to be useful, three things must be known:
1. The current total size of the queue
2. The number of extra people that will be added to the queue over time m
3. The average time it will take for a person to leave the queue over time m The determination of these is not trivial, and the following methodology is used to avoid a number of pitfalls.

Total Queue Size

The total size of the queue is measured by using the sensors 12. These are positioned over the queue to determine how many shopping units are queuing. The sensors can be IRISYS thermal imaging sensors, although other technologies could be used. The queue size used by this system is measured in units that correspond to shopping units, i.e. shopping trolleys or baskets for a supermarket example. IRISYS queue sensors produce queue length data in shopping units. A conversion from people to shopping units may be necessary for alternative sensors.

Number of Arrivals at the Queue

An attempt to directly measure the number of arrivals at the queue could be made by counting people into the queue literally as they arrive. However, there are difficulties associated with this (i.e. people switch queue, or sometimes they leave and then rejoin queues because they forget something, etc). These difficulties make a direct measurement of the number of arrivals hard.

In order to solve this problem, a better approach is to calculate arrivals (A) as follows:

$$A = (Q_{t+1} - Q_t) + P \qquad (8)$$

where P is the number of POS transactions that occur.

i.e. the number of arrivals is equal to the change in the size of the queue, plus, P the number of customers that leave the queue by checking out.

The calculation of A takes place in block 104 in FIG. 6.

The number of shopping units that pass through the checkout can be found directly by reading the electronic Point Of Sale (POS) information from devices 13 at the checkouts, or from any other equivalent equipment.

This approach relies only upon accurate measurement of the total queue size, which is somewhat easier than directly measuring the arrivals. The POS information is exploited to assist in keeping the figure accurate.

Average Time it Will Take for a Person to Checkout

The determination of the average checkout time over a period (m) can be performed by taking the number of POS events that happen over the total number of checkout seconds, i.e.

$$W = \frac{m*S}{P} \quad (9)$$

Making a Prediction

Given Q, A and W, we can say how many checkouts are required.

In terms of predicting how many checkouts are required, a major difficulty is that A or W is not known until after the time has passed, as the methods for determining each of these require knowledge of the future (the future queue size and the number of POS events that happen respectively).

Therefore, some kind of prediction must be made of what the values of A and W will be.

Again, the choice of methodology for making these predictions is open. This example uses the following methodology:

We can retrospectively find the values of A and W, looking at what has already happened (i.e. we can retrospectively generate a training set).

So, as the system that will be performing the prediction runs, it observes what the values of A and W are over time, and uses these to compose a training set, as indicated by block 102 in the figure.

This training set along with instantaneous data is supplied to prediction algorithm 103 to be used to create two predictors, one for each of A and W, represented as Â and Ŵ.

Arrival Predictor

The arrival predictor takes in three extra variables as part of its training set, to make its prediction:
1. The number of arrivals A at the checkouts determined from equation 8
2. The number of people E that enter the store determined from counters 12
3. The number of people D that leave the store determined from counters 12

These three figures are themselves used to generate twelve other figures each. The numbers are placed into a Binary Exponential History. This takes the numbers for each minute, and then averages them over 12 different time periods (2 minutes, 4 minutes, 8 minutes . . . up to 4096 minutes).

Multiple Linear Regression is then used to create an approximate linear function for the number of arrivals that there will be over the next (m) minutes, given the 36 different averages for what has happened previously.

Average Time Taken to Checkout

The checkout time predictor takes the average checkout time W measured over the past few minutes to predict the average checkout time over the next (m) minutes. The past checkout time is fed into another Binary Exponential History of size 12, to give 12 different averages for the checkout time. Multiple Linear Regression is then used to produce an approximate linear function for arrival time over the next (m) minutes, given the 12 different averages for what has happened already.

The Prediction Equation

Now, the number of checkouts required for a future time period (Ŝ) can be calculated as follows:

$$\hat{S} = \frac{Q_t + \hat{A}}{N + \frac{m}{\hat{W}}} \quad (10)$$

Applications

The prediction equation allows, retrospectively, the optimum staffing levels throughout a day to be calculated.

By making predictions for the values of A and W, as detailed above, one can attempt to predict optimum staffing levels ahead of time.

While the above description relates to methods of calculation based on average transaction times, the invention is not restricted to the formulae represented in the description alone. Other methods based on distributions of transaction time may also be applied in the invention.

What is claimed is:

1. A method of operating a queuing system for users queuing to use a facility, the method comprising:
   a) providing a plurality of said facilities that can be rendered operative or inoperative depending on the number required,
   b) determining the number of users Q queuing to use the facility,
   c) determining a desired number of users N queuing to use the facility,
   d) determining a number Â, of users expected to arrive at the facility during a future timestep m,
   e) determining the expected time W taken for each user to use the facility,
   f) calculating by a processing system the required number S of operative facilities at time t using the ratio of the expected queue length and arrivals, to the rate of departure, such that the desired number of users N is maintained at time t+m, said ratio being given by $$\frac{Q_1 + \hat{A}}{N + \frac{m}{\hat{W}}},$$

and
   g) rendering S number of facilities operative.

2. A method as claimed in claim 1 in which step (d) includes determining the number of users arriving at the facility or facilities between time t and time t+1 from the formula:

$$A = (Q_{t+1} - Q_t) + P$$

where the P is the number of users that complete a transaction at the facility between t and t+1.

3. A method as claimed in claim 1 in which the determination of Â is based on values of A determined over previous time periods and extrapolated to predict expected arrivals.

4. A method as claimed in claim 1 in which step (e) includes determining the actual time taken for a user to use the facility from previous time periods, using the formula:

$$W = \frac{m*S}{P}$$

where P is the number of user that complete a transaction at the facility between t and t+m.

5. A method as claimed in claim 1 in which the determination of $\hat{W}$ is based on average values determined over previous time periods and extrapolated to predict expected time per user.

6. A method as in claim 1 in which variable values used to determine S are adaptable to short term variances.

7. An automatic queue management system for users queuing to use facilities, the system comprising:
- a plurality of facilities that can be rendered operative or inoperative according to the need,
- means for counting the number $Q_t$ of users queuing to use the facilities at the time t,
- timer means for determining the length of time W taken for each user to use the facility, and
- processing means for receiving data from said counting means and said timer means and calculating a required number S of operative facilities at time t using the ratio of the expected queue length and arrivals, to the rate of departure, such that the target queue length is maintained at the end of a timestep m, said ratio being given by:

$$\frac{Q_1 + \hat{A}}{N + \frac{m}{\hat{W}}},$$

where N is a predetermined desired number of users queuing per facility;

$\hat{A}$ is the number of users expected to arrive at the facility or facilities during the next timestep m; and $\hat{W}$ is the expected length of time for incoming users to take to use the facility.

8. A system as claimed in claim 7 in which the values of $\hat{A}$ and $\hat{W}$ are calculated using an artificial neural network, support vector machine, liner or non-linear model, Bayesian inference network, Markov model or supervised learning fitted model.

9. A system as claimed in claim 7 further comprising counting means for counting numbers of users entering and/or leaving a defined space.

10. A system as claimed in claim 9 in which data from the counting means is used in the calculation of $\hat{A}$.

11. A system as in claim 7, wherein the system monitors its own performance, and feeds back an error signal as an input into the learning system.

12. A system as in claim 7, wherein the system monitors its own performance, and feeds back an error signal to guide the choice of which of a number of learning methods to apply to best predict $\hat{A}$ and/or $\hat{W}$.

* * * * *

UNITED STATES PATENT AND TRADEMARK OFFICE
CERTIFICATE OF CORRECTION

PATENT NO. : 7,778,855 B2
APPLICATION NO. : 11/894573
DATED : August 17, 2010
INVENTOR(S) : Stuart Holliday It is certified that error appears in the above-identified patent and that said Letters Patent is hereby corrected as shown below:

In Column 8, line 31 (Claim 1, line 12) the word "W" should read -- $\hat{W}$ --;
In Column 8, approximately line 40 (Claim 1, line 19) the word "Q1" should read -- Qt -- in the equation;
In Column 8, approximately line 66 (Claim 4, line 5) the word "user" should read -- users --;
In Column 9, approximately line 25 (Claim 7, line 16) the word "Q1" should read -- Qt -- in the equation; and
In Column 10, line 10 (Claim 8, line 3) the word "liner" should read -- linear --.

Signed and Sealed this
Twenty-second Day of March, 2011

David J. Kappos
*Director of the United States Patent and Trademark Office*